United States Patent Office 3,522,628
Patented Aug. 4, 1970

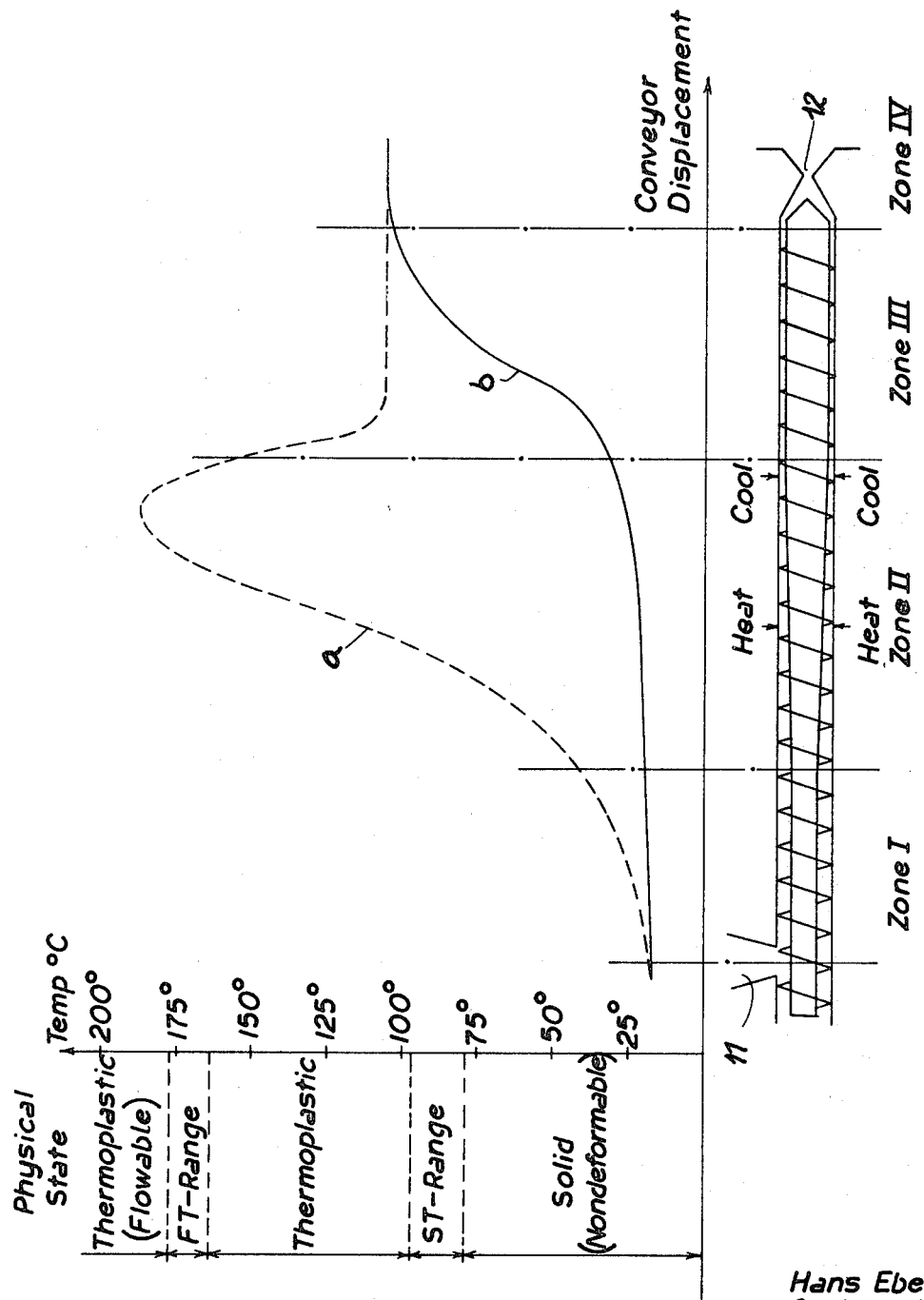

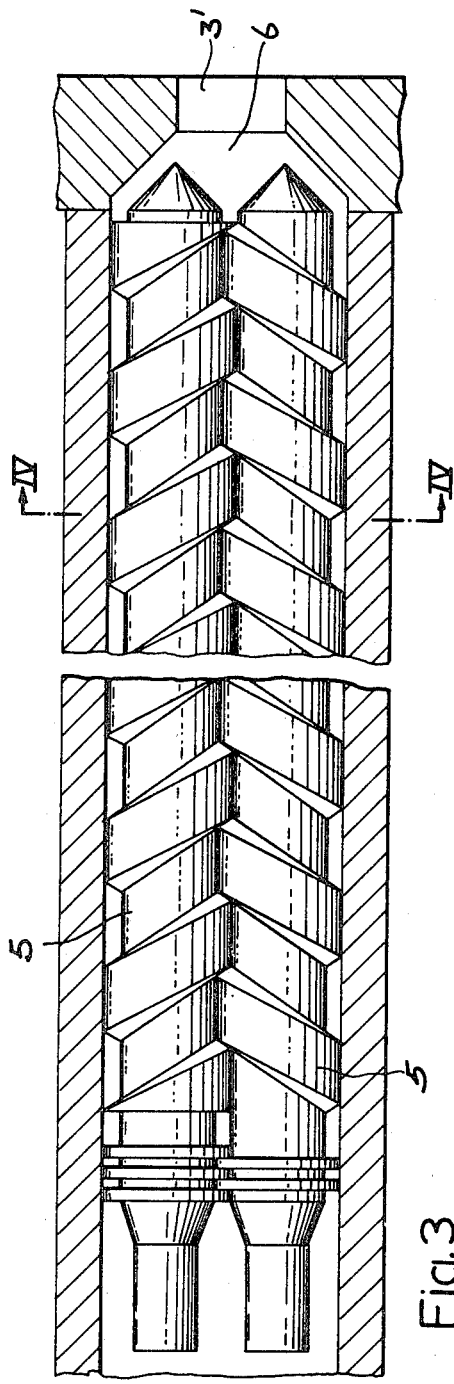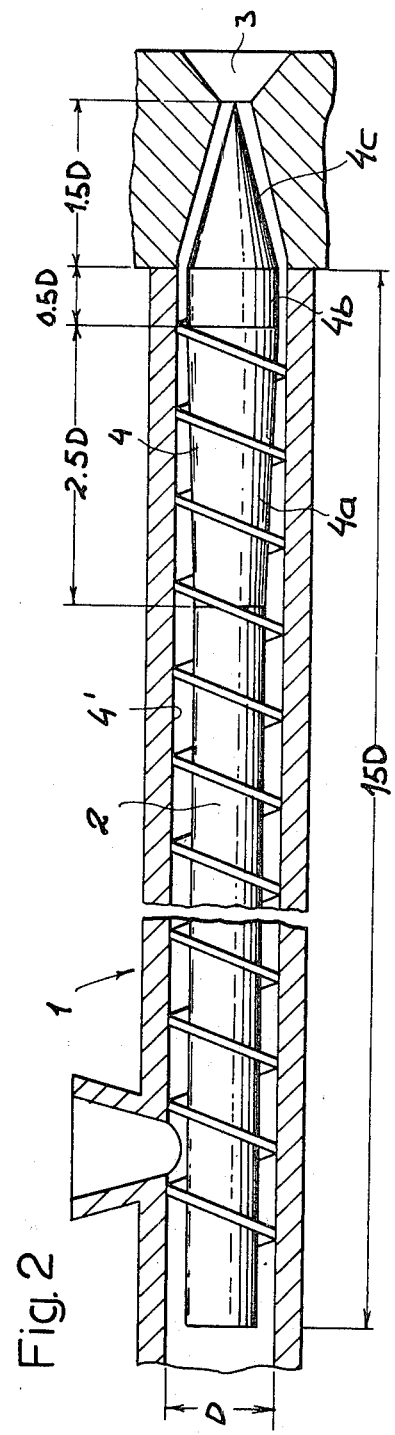

3,522,628
APPARATUS FOR THE PRODUCTION OF CELLULAR THERMOPLASTIC MATERIALS
Hans Eberle, Ludwigshafen (Rhine), and Gerhard Wuttke, Neuhofen, Pfalz, Germany, assignors to Grunzweig & Hartmann A.G., Ludwigshafen, Germany, a company of Germany
Original application July 8, 1965, Ser. No. 470,432. Divided and this application Apr. 29, 1968, Ser. No. 739,980
Claims priority, application Germany, July 8, 1964, G 41,027, G 41,028; July 31, 1964, G 41,236; Aug. 4, 1964, G 41,257; Nov. 27, 1964, G 42,120
Int. Cl. B29f 3/02
U.S. Cl. 18—12      3 Claims

ABSTRACT OF THE DISCLOSURE

An extrusion press for expandable foaming synthetic resin in which the screw is of substantially constant cross-section from the inlet over a major portion of its length. The compression stretch of the screw occupies a minor portion of its length in the region of the outlet while the screw has a helical thread of substantially constant pitch over substantially its entire length and a cylindrical stretch free from threads ahead of the compression stretch.

---

This application is a division of application Ser. No. 470,432, filed July 8, 1965.

Our present invention relates to an apparatus for the production of thermoplastic materials with cellular structure and, more particularly, to the production of cellular bodies of thermoplastic synthetic resins such as polystyrene, polyvinyl chloride, mixtures of these resins with other plastic materials and the like.

The art of producing cellular thermoplastic materials, generally known as "foamed plastic" or "expanded plastic," has developed comparatively recently although the products thereof have found widespread application for many purposes, are available in a wide variety of shapes and sizes, and are produced by a number of different methods. Essentially, however, all prior-art techniques for the production of foamed or expanded plastics require the use of an expanding agent which is introduced into a thermoplastic resin and, when the latter is transformed into a plastically deformable state by heat, expands to create pores within the resin and between particles thereof. Upon cooling, the pores, which may be interconnected in an openwork or discrete as in most cellular structures, are to a large measure retained when the thermoplastic material is restored to its non-deformable state. It will be understood that, for the purposes of the present description, the term "nondeformable" is used to describe the state of the thermoplastic synthetic resin in which it is rigid and nonflowable and cannot be materially altered by the application of light pressures. Thermoplastic resins of the type with which the instant invention is concerned, are generally nondeformable at ambient temperature although, when heated, they pass first through a "softening-transformation" zone (ST zone) between the nondeformable state and a thermoelastic state in which the resin is not fully flowable but has a greatly increased resiliency, flexibility and deformability. Beyond the transformation zone (ST), there is a gradual accretion of this thermoplastic property. The thermoelastic condition exists generally over a temperature range of tens of degrees, while a second transformation zone (FT), in which the thermoplastic material is of increasing flowability, is found between the thermoelestic range and the temperature at which the resin becomes flowable and thermoplastic; in the latter zone, the synthetic resin is converted into a relatively flowable mass which retains the shape imparted to it upon cooling. Materials of this type are particularly suited for use with an expanding agent to yield cellular structures.

In substantially all of the processes for preparing the expandable material, the synthetic resin and the expanding agent are brought together in a manner designed to obtain the maximum absorption of the expanding agent in the resin and a substantially homogeneous product which, when heated, is rendered thermoplastic and flowable so that expansion of the agent can produce the desired degree of foaming. The expanding agents are generally of either of two types, namely those who are highly volatile liquids at ambient temperatures and vaporize to generate gas upon heating, and those that are gaseous at ambient temperature and merely expand during the foaming process.

It has been found that foamed-plastic bodies made by both these techniques are characterized by a shrinkage, with time, whose cause has been traced to the high temperatures to which the resin is subjected prior to the formation of these bodies. The subsequent cooling of the expandable resin appears to have little or no effect upon the shrinkage and the shrinkage is, therefore, attributed to a "memory" characteristic of the molecular structure which cannot be overcome by a cooling step prior to expansion. Such shrinkage is disadvantageous for many reasons, especially when the foamed product is to be used to fill a closed space as an insulating material. In this connection, it may be observed that foamed plastics of this type have been found highly advantageous for structural panels as acoustical and thermal insulation, for refrigerators as wall and door fillers, etc. It will be obvious that, for these purposes, shrinkage of the insulating layer with time is extremely deleterious.

The aforedescribed heating of the synthetic resin to the thermoplastic temperature range has, moreover, a further disadvantage with respect to the process technology. When one employs a plasticising screw or worm, especially in an extrusion apparatus, it is necessary to obtain an optimum throughput of the synthetic resin. The throughput is, of course, determined by the depth of the screwthread for screws of identical rotational speed, pitch and number of threads per unit length (when multiple threads are used). When deep threads are employed, however, the ability of the synthetic resin within the grooves between the threads to absorb heat is diminished since the heat is supplied from the exterior. It is most desirable, therefore, that the initial zone of the screw of conventional systems, at which the synthetic resin is introduced, have relatively shallow threads if a satisfactory heating of the resin is to be accomplished. The actual screw structure is thus a compromise between the requirements of high throughput and high heat transfer. The need for shallow threads is allthemore important because of the poor thermal conductivity of the resin itself; the outer layer proximal to the wall of the screw chamber will thus act as an insulator against further heating of inner layers since the heating means generally surrounds this chamber. In the event absorption of heat from the exterior is insufficient, it is necessary to generate the additional heat by friction within the plastification device by ensuring a strong mixing and kneading action. This action requires considerable driving power and a consequent dimensioning of the device to permit exploitation of this power without breakage of the worm. Because of these latter factors there is a considerable loss of efficiency in convention extrusion systems in which the resin is initially heated to its plastically deformable state before the cooling and ejection from the device. Moreover, the conventional system has hitherto involved high equipment cost, especially when it was desired to provide a single worm or screw with three distinct structurally differing sections for the introduction, mixing or homogenisation and metering stages. The second system is likewise disadvantageous from the point of view of equipment cost and the like since, in addition to the complex worm arrangement discusssed above, it is necessary to provide pressure means for maintaing th normally gaseous expanding agent in a liquid state.

It is therefore the principal object of the present invention to provide an improved method for producing foamed or cellular thermoplastic bodies more efficiently, at a lower cost and of better quality than has been possible heretofore.

A further object of this invention is to provide an apparatus of relatively low cost for producing cellular thermoplastic materials which have a reduced tendency toward the shrinkage.

Another object of the present invention is to provide a method of and an apparatus for the extrusion of expanded or expandable thermoplastic resins without the need for heating them to a thermoplastic or flowable state prior to extrusion.

According to a feature of the present invention, the process is carried out by extruding the gel which is produced continuously from the thermoplastic-resin powder and a liquid expanding agent via a conveyor screw but without additional kneading and mixing and without supplying external heat, while avoiding temperatures in the thermoplastic range. For this reason it is contemplated, according to the invention, to employ a continuous worm which is not characterized by the usual subdisvisions into three zones; the worm thus is constituted merely as a conveyor screw.

Hereinafter, reference will be made to an intake or primary zone, a mixing or homogenization zone, a metering zone and an ejection zone for the purposes of facilitating an understanding of how the apparatus functions. It will be understood, however, that a conveyor screw according to the invention is free from any structural distinctions demarcating such zones and that the zones are to be considered only as axial sections of a single continous conveyor screw. The elevated pressure, to which the synthetic resin/expanding agent mixture is subjected, is produced in accordance with the present invention, by progressively increasing the root diameter of the worm (i.e. the cross-section of the worm) in the direction in which the mixture is displaced. For the purposes of the present invention, the ratio of the root diameters or cross-sections from the inlet side to the outlet side or extrusion die of the screw conveyor is chosen to provide a ratio upwards of 4:1 and preferably higher than about 5:1 in terms of the transport cross-sections through which the material is passed or in terms of the radial height of the screwthread. It has been found that a conveyor screw of this type results in an objection-free formation of the gel at elevated pressures well below the flow temperature of the synthetic resin and oven below the softening temperature. In general, the present invention provides for the heating of the gel after its formation at elevated pressure to a temperature below the thermoplastic state and preferably even below the flow (FT) temperature range, and, even more advantageously, only slightly above the softening temperature (ST) range. When the present invention is used with extrusion devices, this heating can be carried out in the metering zone of the extruder simultaneously with the pressurization of the mixture whereby the compression heat is also exploited. It is possible, because of the lower temperature to which the gel is heated and the availability of compression heat, to supply from external sources substantially less energy than is required for conventional extruders. In fact, it is possible in many cases to avoid entirely any heating of the extrusion assembly from without and thus make use of extrusion worms with large throughput and thread depths and high compression pressures. Finally, the conveyor screw need not be designed for maximum kneading and mixing of the mass but can be a simple conveyor screw designed for maximum throughput.

According to another aspect of our invention, the thermoplastic foam is produced at extrusion from a screw-type press generally described above. Instead of structurally distint worms along a common shaft or a multiplicity of worms driven independently, as is required for conventional techniques, the extrusion press of the present invention is formed with at least one screw having a continuous thread extending from the inlet side of the press to the extrusion nozzle. This arrangement is possible because of the reduced need for considerable mixing, kneading or mastication (with substantial shearing action) of the resin of the instant proecss. Thus, the screw or screws of the improved device can have a relatively short stretch during which the resin/expanding-agent mixture is subjected to elevated pressure and compressive heating to form the gel. The screw or screws can have an introductory section of constant cross-section leading to a relatively short compression section whose thread-depth progressively diminishes without material change of pitch, the compression section being dimensioned so as to obtain the required degree of compression without, however, raising the temperature of the mass much above the ST range, as will be apparent hereinafter. The root portion of the worm, surmounted by the thread of constant pitch, can be of frustoconical configuration, just rearwardly of the outlet in the direction of travel of the conveyed mass, to constitute the compression zone; the tapering portion of the worm thus widens in the direction of the outlet. The screw or screws are thus constituted as simple conveying worms over the major part of their length, thereby producing minimal frictional heating of the mass therealong and permitting exceptionally high throughput. Advantageously, the short frustoconical stretch (compression zone) of the worm terminates in a short cylindrical portion whose diameter is substantially identical with the root diameter of the compression stretch of the worm at its outlet end so that there is no material reduction in the pressure applied to the mass prior to its passage through the nozzle. Furthermore, we have found, it to be desirable to provide a convergent conical portion or tip forwardly of the cylindrical portion. When a single worm is provided, the pointed tip can terminate in the plane of the smallest cross-section of the discharge passage. If a plurality of mating worms are provided, of course, the apex angle of the cones will be greater. This is not only ensures that there will be no breakage of the screws but also reduces the possibility that gel may accumulate between the tips and limit the rate at which the mass is advanced.

According to still another arrangement, a plurality of intermeshing worms are provided with uniform cross-sections throughout their length, the threads thereof and the cross-section of the mouth of the device being so dimensioned, relatively to the rate of rotation of the worms, that the elevated gel-forming pressure is attained between the tips of the screws and the outlet passage by virtue of the high rate of displacement of the mass. This construction results in a reduction in the pulsations of double-worm arrangements which have long concerned those skilled in the art.

The above and other objects, features and advantages of the present invention will become more readily apparent from the following specific examples and description, reference being made to the accompanying drawing in which:

FIG. 1 is a graph illustrating the principles of operation of the present invention by comparison with earlier systems, an extrusion press of the improved type being shown diagrammatically;

FIG. 2 is a longitudinal cross-sectional view through a single-worm extrusion press embodying this invention;

FIG. 3 is a longitudinal cross-sectional view through a double-worm extrusion press according to another aspect of the invention; and FIG. 4 is a cross-sectional view taken along the line IV—IV of FIG. 3.

In FIG. 1, we show a graph contrasting the method of the present invention with a conventional system. Along the abscissa there is plotted the length of the conveyor worm of the linear displacement of the resin by the conveyor. The conveyor 10, diagrammatically illustrated in FIG. 1, is of the conventional type and is replaced, according to this invention, by the screw shown in FIG. 2 and described in connection therewith. The conveyor screw 10 is seen to be subdivided (between the supply hopper 11 and the outlet or die 12) into a succession of zones I, II, III, IV.

Zone I corresponds to the introductory or initial zone and is followed by the "transformation" zone II, the "metering" zone III and the discharge or forming zone IV. Along the ordinate is plotted the temperature to which the mixture of thermoplastic resin and expanding agent is subjected as it is displaced along the screw. The physical state of the resin corresponding to the various temperature ranges is also indicated. The numerical values are given for polystyrene and thus cannot be generalized. A similar characteristic curve will, of course, exist for all thermoplastic resins and combinations. The broken-line curve $a$ shows the characteristics of the conventional systems while solid-line curve $b$ demonstrates the characteristics of the present improvement.

From curve $a$, it can be seen that the synthetic resin (generally the pure resin or a homogeneous mixture of resin and expanding agent) is densified and compressed during conveyor transport through zones I and II and is heated by friction and, at least during the terminal part of its passage through zone II, by an external heating source to a temperature above the flowability range and thus within the thermoplastic range. During the liquefaction or melting of the resin as it is heated to the level, there is a gel formation with the expanding agent previously supplied or added directly in zone II. The gel-like mass is then cooled to the thermoelastic state and is homogenized in zone III prior to being extruded in zone IV.

In the process according to our present invention (curve b), however, the mixture of finely-divided thermoplastic-resin powder (alone or replaced in whole or in part by densified foamed-resin particles) and liquid expanding agent is conveyed without densification or compression and, therefore, with a minimum frictional temperature increase through the equivalent of zone II and the major part of zone III; only just prior to extrusion and over a relatively short stretch of the conveyor path is the mixture subjected to compression and temperature increase to produce a gelatinous condition. The temperature of the gel does not, however, rise above or even to the ST range and preferably reaches a level barely above the ST range.

These conditions can be obtained by a conveyor screw of the type illustrated in FIG. 2. The single worm 1 is constituted as a conveyor screw 2 of constant cross-section over the major part of its length and, shortly before the mouth or die 3 of the extrusion press, merges into a forwardly divergent frustoconical portion 4 constituting the compression stage. The frustoconical stretch 4 has a frustoconical root portion 4a which gradually approaches the cylindrical wall 4' of the housing and terminates at a cylindrical portion 4b of the screw just prior to the forwardly tapering pointed conical tip 4c; the latter extends into the die passage.

We have discovered that optimum results require that the various portions of the screw should have certain critical proportions, as noted below. Thus the ratio of the length of the worm (up to the tip 4c) to the outer diameter thereof ($L/D$ ratio) should be about 15:1; the length of the frustoconical portion 4a should be about 2.5D; the axial length of the cylindrical portion 4b should be about 0.5D; and the length of the tip 4c should be between 1D and 2D (preferably approximately 1.5D). When styrenic polymers are employed, the foamable gel can be introduced at a temperature between 30° and 80° C. and a pressure of about 150 kp./cm.$^2$ is developed; the gel has a temperature between 90° and 120° C. at the mouth 3 of the worm.

In FIGS. 3 and 4, we show a pair of counter-rotating and intermeshing worms 5 which are of uniform cross-section throughout and thus functions only as conveyors along their length. The rotation rate, throughout and pitch are so dimensioned relative to the size of chamber 6 and the die 3 that the compressive force ensuring gel formation is only applied to the mixture in the chamber 6. The heating of the gel also occurs only in this chamber.

We claim:

1. An extrusion press for expandable foaming synthetic resin, comprising an elongated housing having an inlet at one thereof and an outlet at the other end thereof; and a conveyor screw journaled within said housing while extending substantially from said inlet to said outlet, said screw being of substantially constant cross-section from said inlet over a major portion of its length and having a compression stretch over a minor portion of its length in the region of said outlet for compressing said resin, said screw having a helical thread of substantially constant pitch over substantially its entire length and a generally cylindrical stretch free from threads forwardly of said compression stretch, said compression stretch having generally a frustoconical root portion diverging in the direction of advance of said resin by said screw, and the ratio of the length L of said screw to the outer diameter D thereof being substantially $L/D=15:1$, said cylindrical stretch having an axial length of substantially 0.50, and said compression stretch having an axial length of substantially 2.5D.

2. An extrusion press as defined in claim 1 wherein said screw has a generally conical point with an axial length of substantially 1D to 2D forwardly of said cylindrical stretch and converging in the direction of advance of said resin by said screw.

3. An extrusion press as defined in claim 2 wherein said point extends into said outlet.

References Cited

UNITED STATES PATENTS

| Re. 23,839 | 6/1954 | Magerkurth et al. | 18—125 |
| 2,653,349 | 9/1953 | Elgin et al. | 18—125 XR |
| 2,872,703 | 2/1959 | Gambrill et al. | 18—125 |
| 3,123,860 | 3/1964 | Vesilind | 18—125 |
| 3,239,883 | 3/1966 | Ferrari | 18—125 |
| 3,243,848 | 4/1966 | Miller et al. | 18—125 |
| 3,263,276 | 8/1966 | Maier | 18—125 |

WILLIAM J. STEPHENSON, Primary Examiner